United States Patent [19]

Wickre

[11] Patent Number: 4,762,229
[45] Date of Patent: Aug. 9, 1988

[54] METHOD AND APPARATUS FOR ORIENTING OR LABELING A BEVERAGE DISPENSING CONTAINER RESPONSIVE TO TACTILE STIMULI

[76] Inventor: Monica Wickre, 1419 S. Third St., Aberdeen, S. Dak. 57401

[21] Appl. No.: 69,108

[22] Filed: Jul. 2, 1987

[51] Int. Cl.⁴ ............................................. B65D 73/00
[52] U.S. Cl. .................................. 206/459; 220/1 BC; 220/1 R; 220/90.2
[58] Field of Search .................. 220/1 R, 85 D, 90.2, 220/90.6, 1 BC; 206/459

[56] References Cited

U.S. PATENT DOCUMENTS

| D. 168,784 | 2/1953 | Del Mas | 220/90.2 |
|---|---|---|---|
| 1,421,696 | 7/1922 | Kucera | 220/90.2 |
| 2,608,841 | 9/1952 | Rice | 220/90.6 |
| 3,263,855 | 8/1966 | Pugh, Sr. | 220/90.2 |
| 3,899,107 | 8/1975 | Gaal | 220/85 D |
| 4,235,348 | 11/1980 | Watson | 220/90.6 |
| 4,322,014 | 3/1982 | Philip | 220/90.6 |

FOREIGN PATENT DOCUMENTS 2136271 9/1984 United Kingdom ............ 220/94 A

Primary Examiner—Joseph Man-Fu Moy
Attorney, Agent, or Firm—Moore & Hansen

[57] ABSTRACT

A tactile stimulus producing means placed on the generally smooth surface of the side wall of the cylindrical body portion of a beverage container in a position that will normally be contacted by the hand of a person drinking from the beverage container spout. The tactile stimulus producing means should be contacted by the person's thumb or finger tips, thus permitting them to recognize the misalignment of the beverage container and reorient the container so that the spout is properly positioned, without having to visually observe the beverage container or shift their attention from another activity.

The particular preferred embodiments include a shallow circular recess positioned on the front side of the beverage can vertically below the point on the rim which is displaced the least distance across the top of the beverage can from the spout aperture, or a vertical channel or series of scored ridges extending between the top and bottom of the beverage can in the same angular position. The tactile stimulus producing means may alternately be aligned on the rear of the beverage can opposite the position previously described, and may include a line of braille letters and numerals designed to convey certain essential product information.

23 Claims, 1 Drawing Sheet

METHOD AND APPARATUS FOR ORIENTING OR LABELING A BEVERAGE DISPENSING CONTAINER RESPONSIVE TO TACTILE STIMULI

BACKGROUND OF THE INVENTION

This invention relates generally to individual beverage dispensing containers of the type that are used for the sale and consumption of carbonated beverages such as soft drinks, beer, or mineral water, and particularly to a method of orienting the beverage dispensing container within the user's hand responsive to tactile stimuli on said beverage dispensing container.

Individual beverage dispensing containers are well known to the art, comprising a product sold at the retail level in volumes of well over one million units daily. The most common beverage dispensing containers are cans and bottles, each of which conform to several industry standards.

Although there are an almost unlimited variety of beverage dispensing containers on the market, the beverage containers of primary concern with regard to this invention are those which are intended to function both as a point of sale container for individual beverage servings and as an optional drinking receptacle for use by the purchaser.

Beverage dispensing cans, while previously made from steel and having a randomly placed vertical seam along the cylindrical can body, are now generally constructed from aluminum or an aluminum alloy, and do not present any vertical seams. The beverage cans may have any one of a variety of easily opened non-resealable closures well known to the art, including the more popular "pull tab" and "pop-top" type closure mechanisms.

In each closure type, a scored line in the top surface of the beverage can defines an peripherally enclosed aperture forming panel which may be detached from the remainder of the can top by pressure, torque, or a vertical pulling or tearing force. The aperature forming panel may be attached at the centermost end to a pull ring such that a forwardly pivoting and upwardly pulling force on the ring tab will tear the aperature forming panel away from the can top. In this case the pull ring and aperture forming panels are completely removed from the can top in this "pull top" embodiment.

In the "pop top" type of closure, the ring tap is similarly attached by a rivet to the can top adjacent the centermost end of the aperture forming panel such that upward pressure on the ring tab will place a levered downward pressure on the aperture forming panel with the rivet acting as a fulcrum, until the aperture forming panel tears away from the can top and is bent into the interior of the can but not completely removed therefrom.

Representative examples of the most common pull rings and aperture forming panels are shown in U.S. Pat. Nos. 3,795,341 and 3,795,340. Recent improvements and modifications in the non-detachable pop-top type closures are disclosed in U.S. Pat. Nos. 4,480,763; 4,325,490, and 4,129,227. Other intermediate embodiments of the pull tab and pop-top closures have also been disclosed, one such example being the stowable tab and tear strip shown in U.S. Pat. No. 3,795,342. Similar pull rings and pop-tops have also been shown and discussed in relation with devices for opening such closures, recent examples of which include U.S. Pat. Nos. 4,414,865; 4,507,988; and 4,590,822.

Bottles are generally made from glass or plastic resin, and are shaped to have a generally cylindrical main body with a narrowed neck and rim having a slightly bulbous pouring lip. Although the shapes of these bottles vary widely, bottlers and beverage producers have selected several uniform styles for similar types of beverages, with some beverage producers adding special external ornamentation to the general bottle shape so as to develop trademark properties in the bottles themselves. Such distinctive and familiar bottles include those associated with Coca Cola, 7-Up, or Perrier.

Traditionally, glass bottles were sealed with a pressure fitted, crimped cap having a plastic or cork liner. These crimped bottle caps were removed through the upward prying or levering action of a bottle opener placed under one edge of the cap. Alternately, caps for some beverage bottles were designed to be twisted off the lip of the rim by the user, the cap having a single threaded region which would sealingly engage the bulbous lip of the rim and could be removed by a quarter or half rotation of the cap. Bottles and caps of this type have also been disclosed and discussed in connection to devices specifically suited for removing those bottle caps, such as that shown in U.S. Pat. No. 4,414,865.

The more common glass and plastic beverage dispensing bottles now incorporate larger multi-threaded rim sections and resealable metal caps, which similarly may include a plastic or foam sealing gasket. The caps require several rotations to disengage the threads of the cap from the bottle rim, and an equal number of rotations to reseal. The caps also have a lower depending skirt section which is divided into a plurality of perforated tabs, and which form an additional seal which is permanently broken when the cap is first removed from the bottle.

Glass bottles have recently been introduced to the market with thin styrofoam labelling bands which encircle the body of the bottle and are fastened along a thermally welded vertical seam, and serve to increase the insulating quality of the bottle against heat from the user's hand. The foam labelling band also enhances one's ability to grip the bottle, especially when wetted by condensation.

The plastic bottles most often selected by beverage producers tend to be two part containers having a clear plastic PET resin inner liner with a semi-circular bottom, and an opaque outer shell which encircles the lower portion of the liner and produces a flat and stable base for resting the container, as well as increasing the insulating properties of the bottle from any sources of heat associated with the surface on which the bottle is placed.

Most soft drink beverages and beers are produced and packaged in bottles and cans, thus permitting the purchaser a choice of sizes and container types. Beverage cans generally contain 12 fluid ounce servings, while bottles will hold 16 fluid ounces, although 10, 12, and 20 ounce single serving or 32 and 64 ounce multi-serving bottles are also common.

Both types of beverage containers—bottles and cans—are generally found in stores in approximately equal quantities, as single items or packaged in cases. Cans are generally attached together in "six packs" by heat shrink thermo-plastic bands which fit around the top of each can, or in "twelve pack cartons" constructed from a folded cardboard blank. Both the six and twelve pack arrangements provide for easy removal of the individual cans, and afford gripping means for carrying the entire case in one hand. Bottles may similarly be purchased individually, or in six, ten, and twelve pack cases comprised of folded cardboard cartons or molded plastic carriers, such as that shown in U.S. Pat. No. 4,498,582.

While primarily a matter of personal preference, bottles are generally selected when an easily resealable beverage container is desired, although devices for resealing cans have been devised. Representative examples of such devices are shown in U.S. Pat. Nos. 4,429,804; 3,727,787; and 3,637,104. These and other resealing devices for beverage cans have not achieved great commercial success or consumer acceptance, since the beverages cans are generally purchased with the intent to consume the entire portion, and the resealing devices constitute an additional expense and an inconvenient item to carry.

Bottles also generally provide a larger individual serving, are slightly more expensive, retain the beverage in a cooled state for a longer time, and are not as cold to hold in one's hand for an extended period. Cans are more readily cooled, have smaller individual servings, are generally less expensive, may be more easily received within holders such as those designed as automotive accessories, but may be more uncomfortable to hold for longer periods because they lack effective insulation.

Aluminum cans are more closely associated with recyclability in the minds of consumers, with many automatic vending-type machines for returning aluminum cans in exchange for a set per can amount having been designed and introduced in public places. Glass and plastic containers may also be recycled, although the more accepted means of returning these containers is directly to the original store at which the containers were purchased, in exchange for the return of a predetermined deposit.

Although there have been many innovations concerning the construction of and closures for the beverage containers described above, as well as for various items peripherally related to the opening, resealing, packaging, or insulation of those beverage containers, there have been relatively few improvements directly related to one of the primary purposes of the beverage container itself—functioning as a serving dispenser and drinking receptacle for the beverage.

The narrowed neck and rounded rim of most bottles presents a natural drinking spout. With the aperture forming panels removed from the top of a beverage can, the open apertures similarly form a convenient and generally safe spout through which a person may directly consume the beverage.

Because the spout on the beverage can must be displaced somewhat from the confronting and upwardly projecting rim of the can, and because the spout must be oriented towards the mouth of the user as they begin to tilt the beverage can to drink therefrom, the standard beverage can does lead to more accidental spills and mishaps than would occur with drinking glasses or bottles. Fluid may leak between the spout aperture, rim, and the mouth of the user since a tight seal is difficult or uncomfortable to completely form and maintain.

Because beverage cans are frequently used in automobiles, or other situations where an individual will be preoccupied or focussing their attention on some other activity while attempting to drink from the beverage can, it is not uncommon for a person to pick up the beverage can from where they last rested it after drinking, assuming the can and spout are properly aligned for drinking, and learn that the position of the spout has changed due to the can having been rotated or jarred. While the individual may feel the misalignment of the can with their mouth prior to tilting the can, it is often results that the person accidentally pours a good quantity of the beverage on their face, chest, lap, or surrounding area.

Another situation in which spills often occur is with younger children who are just learning to drink from a glass or beverage can, who are not strong enough or whose hands are not large enough to control the weight of the beverage can as they attempt to drink from it, or whose mouths are too small to compensate for any misalignment of the spout of the beverage can and to form a fluid tight seal therewith.

There have been some suggested solutions to the problem of misalignment of the spout of the beverage can.

One solution has been to incorporate an enclosed tubular drinking spout which projects upwardly from the beverage can itself. Such an enclosed sanitary drinking spout is shown in U.S. Pat. No. 4,561,557. Another related solution is the inclusion of a standard flexible drinking straw into the beverage can, such as that shown in U.S. Pat. No. 4,462,503. In each case, the spout or straw is affixed to the pull tab, and is moved to an extended, drinking position by the action of opening the pull tab.

These spout and straw mechanisms have several common drawbacks and deficiencies, however. They represent a significant additional expense in manufacturing the beverage can, particularly relative to the minimal per unit cost of each beverage can. The particular modifications may not be desired by many purchasers who prefer to drink directly from the aperture spout, and would thus not purchase a beverage can having an enclosed or straw-like spout. Because the beverage cans are mass produced and periodically standardized throughout the industry, it would not prove practical or desirable for beverage producers or bottlers to incorporate a design feature which would not be universally accepted among beverage can purchasers. Additionally, spout mechanisms which may be added to the beverage cans may be sold separately for those who desire them, but present the same problems and inconveniences as those devices used for resealing beverage cans.

Another method for improving the beverage can as a drinking receptacle has been the production of various gripping handles which may be attached to the individual can. One such handle is disclosed in U.S. Pat. No. 4,602,723 and is designed to receive the rear portion of the pop-top and grip the top rim top of the can and clip under the lower rim on the bottom of the can, the handle being flexed to securely hold the beverage can and provide a drinking container similar to a mug. Other types of handles comprise molded plastic circular hoops or cylindrical tubes into which a beverage can or bottle may be inserted, with various shaped gripping handles positioned along the side of the beverage can. One more recent example of such a handle unit is shown in U.S. Pat. No. 4,666,197, although many similar designs for cans, bottles, and milk cartons have been produced.

Another popular beverage can accessory which is includes an insulated nylon or Gortex shell which wraps around the beverage can and is fastened with a vertical velcro seam. These can wraps are often printed with a company logo and used for advertising and promotional plans. While enhancing the insulating quality of the beverage can and further improving one's grip on the beverage can, the can wraps do little to prevent the problem of misaligned cans.

Similarly, the plastic insulating device disclosed in U.S. Pat. No. 4,372,453 permits a beverage can to be inserted into an eccentrically aligned twin walled canister, and locked into placed by a rotating collar. Because the beverage can is then offset from the center of the canister with the spout aperture aligned toward the nearest point along the canister perimeter, a person could detect the orientation of the beverage can within the canister based solely upon a perceived imbalance in the weight distribution of the canister when held in one's hand. However, the locking collar of this device does not serve to hold firmly, and frequently loosens permitting the can to shift. Once the can is partially emptied, the added weight of the canister makes it difficult to determine whether the can is oriented properly, and the thickness of the twin wall presents an even greater obstacle to forming a fluid tight seal between the beverage can and the mouth of the person drinking.

Other tactile sensing means to aid in the alignment and orientation of objects other than beverage dispensing containers but designed to be held in the hand—such as a key or fountain pen—have previously been disclosed, representative examples being shown in U.S. Pat. Nos. 2,432,498 and 2,491,699 respectively. In each case, the item being held must be oriented in a particular rotational plane in order to function properly or communicate with an interrelated apparatus. The particular devices shown include collars or clips which are attached to the object being gripped, but do not related to methods of incorporating a tactile stimulus producing member into the generally smooth surface of a beverage dispensing container.

SUMMARY OF THE INVENTION

It is therefore one object of this invention to design an improvement to a beverage dispensing container which may permit the beverage container to be responsively aligned or oriented within the hand of the user so as to present the drinking spout or aperture in the correct position for drinking directly therefrom, the means for facilitating this improvement being a tactile sensing means incorporated into the beverage container and which may be recognized by the user gripping the beverage container in a standard manner.

It is another object of this invention to design the above improvement in a beverage dispensing container such that it may particularly be incorporated into a variety of existing beverage cans and bottles of the type presently being manufactured and distributed by beverage producers and bottlers.

It is an additional object of this invention to design the above improvement for a beverage container such that it will be practical and cost efficient to manufacture, and will comprise an integral component of the beverage can or bottle itself.

It is a related object of this invention to design the above improvement for a beverage can such that it may be incorporated into an existing beverage can without interfering with the normal operation of the beverage can, including distribution of the can via vending machines, packaging or binding the cans into grouped packages, or the like.

It is a distinct object of this invention to design the above improvement such that it may also include and convey labelling information regarding the contents of the beverage container.

It is yet another object of this invention to design the above improvement such that it may be used as the focus of and incorporated into promotional, advertising, and public service campaigns of various sorts, particularly those related to accidents and safe driving, public events or locations at which alcoholic beverages are dispensed, young children, and aids for the visually impaired.

Briefly described, the improvement of this invention comprises placing a tactile stimulus producing means on the substantially smooth surface of the side wall of the cylindrical body portion of a beverage container in a position that will normally be contacted by the hand of a person drinking from the beverage container spout. The tactile sensing means should be contacted by the person's thumb or finger tips, thus permitting them to recognize the misalignment of the beverage container and reorient the container so that the spout is properly positioned, without having to visually observe the beverage container or shift their attention from another activity.

The particular preferred embodiments include a shallow circular or oval recess positioned on the front side of the beverage can vertically below the point on the rim which is displaced the least distance across the top of the beverage can from the spout aperture, or a vertical channel or series of scored ridges extending between the top and bottom of the beverage can in the same angular position. The tactile stimulus producing means may alternately be aligned on the rear of the beverage can opposite the position previously described, and may include a line of braille letters and numerals designed to convey certain essential product information.

DESCRIPTION OF THE PREFERRED EMBODIMENTS

The beverage dispensing container with tactile sensing means of this invention is shown in FIGS. 1–7 and referenced generally therein by the numeral 10.

It should be noted that the embodiments of the beverage dispensing container with tactile sensing means 10 of this invention are shown in FIGS. 1-7 depicted as applying particularly to a beverage dispensing can 12, although the methods disclosed herein may be practiced in association with beverage dispensing containers of many varieties, as shall be described.

Figure 1:
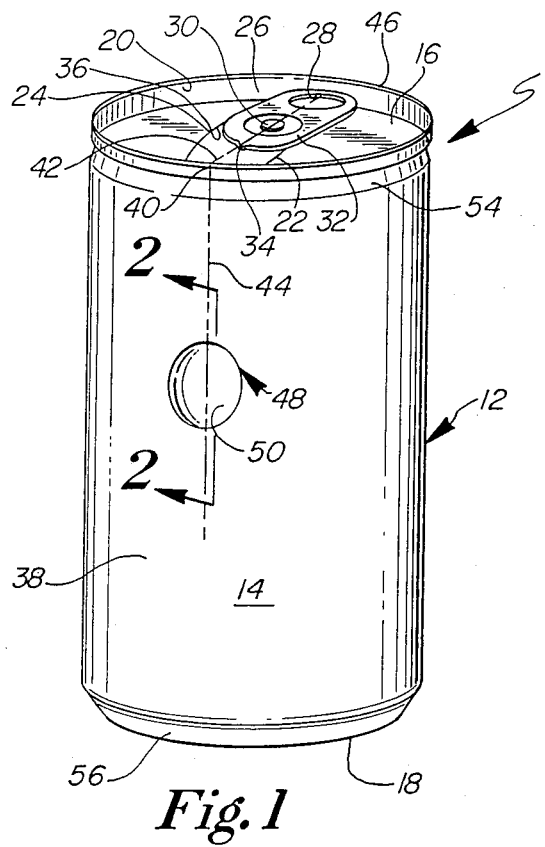
FIG. 1 is a perspective view of the beverage dispensing container with tactile sensing means of this invention.

Referring to FIG. 1, the beverage can 12 consists of a generally cylindrical body side wall 14, and a relatively planar can top 16 and bottom 18. The body 14 has a substantially smooth and gently curved surface, with a diameter of approximately 2½" to 3". The body 14 may include a label or the surface may be printed, however the surface of the can 12 remains substantially smooth to the touch.

The can top 16 may be a separate component which is attached to the side wall 14 of the can 12 along a crimped or rolled rim 20, as disclosed in U.S. Pat. No. 4,564,119. The can top 16 is sealed to the side wall 14 in such a manner as to prevent the carbonated beverage contained in the can 12 from bursting the seal along the rim 20. The can bottom 18 may be a separate component attaches in a manner similar to the can top 16, or may be formed integrally with the side wall 14 of the can when the can body 12 is extruded or otherwise formed from aluminum.

The can top 16 further defines an aperture forming panel 22 which is separated from the remainder of the can top 16 by a scored tear line 24. As shown in FIG. 1, the can 12 includes a pop-top type closure 26 having a pivotable ring tab 28 fastened to the can top 16 by a rivet 30. The ring tab 28 is positioned such that the rivet 30 extends through the can top 16 on the exterior of, but closely adjacent to, the aperture forming panel 22. A portion 32 of the ring tab 28 extends across the tear line 24 and over the aperture forming panel 22, with a downwardly depending pressure point 34 being positioned approximately in the center of the aperture forming panel 22.

Exerting an upward pulling pressure and forward pivoting force on the ring tab 28 will cause the ring tab 28 to pivot with the rivet 30 acting as a fulcrum, thereby causing the pressure point 34 to exerting a downward pressure on the aperture forming 22, until the force causes the aperture forming panel 22 to tear away from the can top 16 and be bent downwardly and inwardly into the can 12, thus producing a generally oval-shaped drinking spout or pouring aperture 36 in the position previously occupied by the aperture forming panel 22.

One edge or end of the oval-shaped spout or aperture 36 is therefore most closely adjacent to, or is displaced the least distance across the can top 16 from, the rim 20 of the can 12 along the front side of the can 38. This side of the can 38 may be referenced by a point 40 on the rim 20 which represents the endpoint of a shortest line segment between the rim 20 and the tear line 24, that segment constituting a portion of the line 42 extending from those points through the radial axis of the can 12. The person using the beverage can 12 will generally grip the can 12 in their hand in such a manner that this front side of the can 38 will be oriented toward their mouth, and will contact their lower lip against the can at a point directly in line with the center of their mouth.

When a person grips the beverage dispensing can 12 to drink directly from the spout 36, they will generally grip the can 12 such that their thumb rests against the front side 38 of the can 12 and extends across a line 44 which depends vertically from the point 40 on the rim 20 which represents the endpoint of a shortest line segment between the rim 20 and the pouring aperture 36.

The fingers of the same hand will generally extend in the same direction across a vertical line depending from the point 46 diagonally opposing the front side 38 of the can 12 and point 40.

Referring again to FIG. 1, it may be seen that the beverage dispensing container 10 of this invention further includes a tactile stimulus producing member 48. The tactile stimulus producing member 48 comprises a shallow circular or oval recessed region 50 which extends into the interior of the can 12 a short distance. The recessed region 50 should have a height, width, and depth sufficient for the recessed region to be readily distinguished from the smooth surface of the body 14 when contacted by the thumb of the person gripping the can 12. The recessed region 50 should also be suitable sized and positioned to increase the probability that a person with slightly smaller than normal hands will have their thumb contact at least a portion of the recessed region 50, given a normal range of heights between the top 16 and bottom 18 of the can 12 at which the person might grip the can 12.

Figure 2:
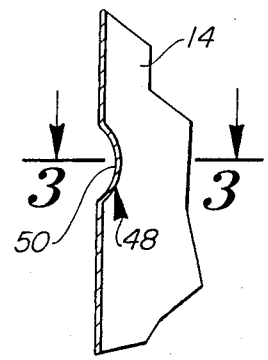
FIG. 2 is a partial cross sectional view of the beverage dispensing container with tactile sensing means of FIG. 1 taken through line 2—2 of FIG. 1.
Figure 3:
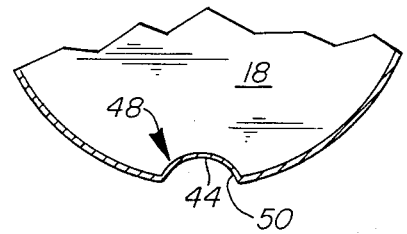
FIG. 3 is a partial cross sectional view of the beverage dispensing container with tactile sensing means of FIG. 1 taken through line 3—3 of FIG. 2.

Referring to FIGS. 2 and 3, it may be seen that the recessed region 50 comprising the tactile stimulus producing member 48 may be formed by indenting or deforming the body side wall 14 which is constructed from a soft, pliant, and extremely thin aluminum or aluminum allow sheet material. The deforming of the body side wall 14 may occur once the can 12 has been completely constructed and filled with a beverage, although it would be preferable to perform the process when the body side wall 14 of the can 12 is in unfinished form, possibly attached to other similar side walls 14 in a sheet or roll of uncut blanks.

Figure 4:
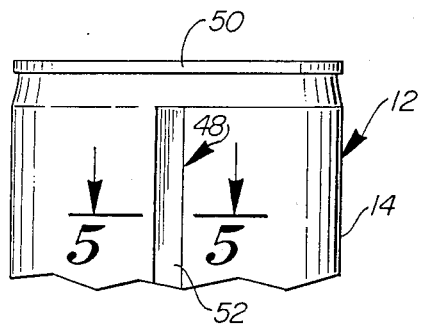
FIG. 4 is a partial elevation view of an alternate embodiment of the beverage dispensing container with tactile sensing means of this invention.
Figure 5:
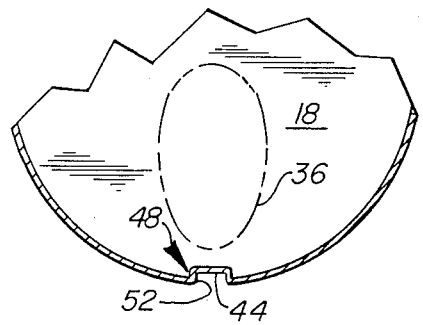
FIG. 5 is a partial cross sectional view of the beverage dispensing container of this invention taken through line 5—5 of FIG. 4.

Referring to FIGS. 4 and 5, another embodiment of the beverage can with tactile sensing means 10 is shown. This embodiment comprises a tactile stimulus producing member 48 in the form of a vertical channel 52 which is recessed into the front side 38 of the can 12. The channel 52 extends substantially the complete height of the front side 38 of the can 12, terminating a distance from the rim 20 at the top 16 of the can 12, and the bottom of the can 18, as shown in FIG. 4. The channel 52 may be recessed a very slight degree and remain readily distinguished from the smooth surface of the body 14 when contacted by the thumb of the person gripping the can 12. The channel 52 preferably extends between a top curved concave recess 54 and a bottom undercut ridge 56 which are integral components of existing beverage cans 10, and which define a region extending over substantially the entire height of the body 14 of the can 12. The channel 52 may therefore be produced or incorporated into the body 14 of the can 12 at generally the same time or during the same process that the concave recess 54 and undercut ridge 56 are being formed.

Figure 6:
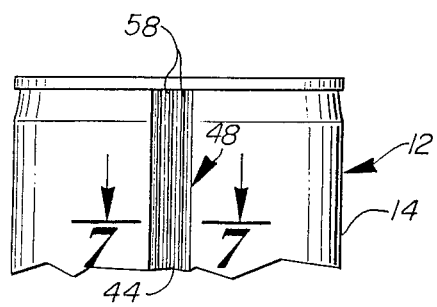
FIG. 6 is a partial elevation view of an alternate embodiment of the beverage dispensing container with tactile sensing means of this invention.
Figure 7:
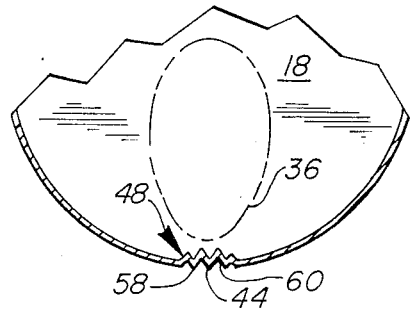
FIG. 7 is a partial cross sectional view of the beverage dispensing container of this invention taken through line 7—7 of FIG. 6.

Referring to FIGS. 6 and 7, an alternate embodiment of the beverage can with tactile sensing means 10 is shown. This embodiment comprises a tactile stimulus producing member 48 in the form of a vertical region of parallel ridges 58, and a plurality of recesses or grooves 60 between the ridges 58. As shown in FIG. 6, the region of parallel ridges 58 extend completely to the rim 20 at the top 16 of the can 12, as well as to the bottom 18 of the can 12. The ridges 58 and grooves 60 need only have sufficient depth so as to be readily distinguished from the smooth surface of the body 14 when contacted by the thumb of the person gripping the can 12. The ridges 58 and grooves 60 may be produced by scoring the generally smooth surface of the body side wall 14 of the can 12, or by actually deforming or creasing the body 14 in a manner similar to that described above with reference to the vertical channel 52. It is understood that the parallel ridges 58 may in some applications be replaced by a knurled region or scoring on the surface of the body 14 of the can 12 which are not parallel.

It is understood that one preferred embodiment would include placement of the vertical channel 52 or region of parallel ridges 58 on the back side of the can 46, or the reverse side 46 relative to the location of the spout 36. In this manner, one or more of the fingers of the person gripping the can 12 will extend across the channel 52 or series of parallel ridges 58, and therefore across the vertical line depending from the point 46 diagonally opposing the front side 38 of the can 12 and point 40.

It is also contemplated that the tactile stimulus producing member 48 may comprise a thin, textured decal or "sticker" with a generally raised surface relative to the body 14 of the can 12 and which may be applied to the generally smooth surface of the body 14 of the can 12 with an adhesive or other fastening means, either during the manufacture of the can 12 or after the can 12 has been produced and filled with a beverage. The decal or sticker may be printed to conform to or cooperate with the labeling on the can, or may be removable by the purchaser and incorporated into a promotional or advertising plan.

It is further understood that the tactile stimulus producing member 48 may comprise a series of raised projections or "dots," and in particular that those projections may be arranged in one or more lines along the body 14 of the can 12 in approximately the same position as the channel 52 or region of parallel ridges 58, those dots being arranged to form a vertical band or series of lines comprising figures and numerals of the braille alphabet, with those figures and numbers further conveying essential product information such as the product type and brand name, volume, additive or ingredient warnings, and additional information as to flavoring, nutritional data, calories, etc.

In operation, a person will grip the body 14 of the can 12 such one or more of the fingers of the gripping hand are disposed perpendicularly across a vertical line depending from the a point 46 on the side of the can 12 opposing the spout 36, and such that the thumb of the gripping hand extends in the same direction across the vertical line 44 along the front side 38 of the can 12 beneath the spout 36.

In this position, one of the fingers or the thumb of the hand of the person gripping the can 12 should normally contact the tactile stimulus producing member 48, if the spout 36 is properly oriented toward the mouth of the person gripping the can 12 when that person attempts to drink directly from the spout 36.

The person may thus reorient the spout 36 and the can 12 responsive to sensing the tactile stimulus producing member 48. If the tactile stimulus producing member is contacted with the appropriate digit, being either a finger or the thumb, and the tactile stimulus producing member 48 is positioned and oriented in the correct position relative to that digit such that the spout 36 will be aligned with and oriented toward the mouth of the person when they drink directly from the spout 36, then the person may proceed to drink from the can 12. If the tactile stimulus producing member is not contacted appropriately, the person may rotate the can 12 within their hand until the tactile stimulus producing member 48 is moved to an appropriate position such that the tactile stimulus producing member 48 is contacted by and oriented relative to the corresponding digit.

It should be noted that in order to foster reliability upon this method of orienting the spout 36 of the can 12 responsive to tactile stimuli, and without visual observation, it is imperative that the tactile stimulus producing member 48 be placed in a fixed relation to the spout 36 and be oriented in same manner in all similar cans 12 being produced. Although alignment of the tactile stimulus producing member 48 is relatively simple to achieve, the complications of ensuring industry uniformity are reduced by use of an embodiment wherein the tactile stimulus producing member 48 comprises and encompasses a vertical line extending along substantially the entire height of the body 14 of the can 12, either located on the line 44 directly beneath the spout 36, or on the side of the can diagonally opposing the spout 36.

While the preferred embodiments of the present invention have been described, it should be understood that various changes, adaptions and modifications may be made therein without departing from the spirit of the invention and the scope of the appended claims.

What is claimed is:

1. In a beverage dispensing container of the type having a generally cylindrical body with a pair of opposing sides, said body defining a receptacle region for containing a liquid beverage and said top defining a pouring aperture from which a person may drink said beverage when said person grips said beverage dispensing container in a hand, said hand having a plurality of fingers and an opposable thumb, said pouring aperture being located generally adjacent to one of said sides of said cylindrical body, the improvement comprising:

a tactile stimulus producing member disposed on the body of the beverage dispensing container, said tactile stimulus producing member being positioned such that said tactile stimulus producing member is contacted by the thumb of the person when the person grips the beverage dispensing container with the fingers of the hand contacting a first of the sides of the body and the thumb of the hand contacting a second of the sides of the body, said tactile stimulus producing member being predeterminately positioned and oriented in fixed relation to the second side of the body to which the pouring aperture is generally adjacent, whereby the person gripping the beverage dispensing container may selectively reorient the beverage dispensing container within the hand responsive to sensing the tactile stimulus producing member.

2. The beverage dispensing container of claim 1 wherein the pouring aperture is located generally adjacent to the second side of the body and the tactile stimulus producing member is positioned on the second side of the body.

3. The beverage dispensing container of claim 1 wherein the body of the beverage dispensing container has a rim, there being a point on said rim displaced the least distance from the pouring aperture, and further wherein the tactile stimulus producing member is positioned on the side of the body generally vertically beneath said point on said rim displaced the least distance from the pouring aperture.

4. The beverage dispensing container of claim 1 wherein the body of the beverage dispensing container has a top and a bottom and a height measured between said top and said bottom, and further wherein the tactile stimulus producing member is located within a region between one third said height and two thirds said height of the beverage dispensing container as measured from said bottom of said body.

5. The beverage dispensing container of claim 1 wherein the body has an outer surface and further wherein the tactile stimulus producing member comprises a recessed region on said surface of the body.

6. The beverage dispensing container of claim 5 wherein the recessed region has a depth measured radially inwardly from the outer surface, said depth being great enough such that the recessed region may be readily distinguished from the substantially smooth outer surface of the body when contacted by the hand.

7. The beverage dispensing container of claim 5 wherein the recessed region is generally circular in shape.

8. The beverage dispensing container of claim 1 wherein the body has an outer surface and further wherein the tactile stimulus producing member comprises a raised region on said surface of the body.

9. The beverage dispensing container of claim 8 wherein said raised region comprises a decal fixedly applied to the surface of the body.

10. The beverage dispensing container of claim 9 wherein the decal is attached to the surface of the body with an adhesive fastener.

11. The beverage dispensing container of claim 8 wherein the raised region is generally circular in shape.

12. The beverage dispensing container of claim 1 wherein the body has a substantially smooth outer surface, and wherein the tactile stimulus producing member comprises a recessed channel extending substantially vertically along the first side of the body, said channel having a width and a depth, said depth being great enough such that the recessed channel may be readily distinguished from the substantially smooth outer surface of the body when contacted by the hand.

13. The beverage dispensing container of claim 1 wherein the body has a substantially smooth outer surface and wherein the tactile stimulus producing member comprises a region having a plurality of parallel ridges extending substantially vertically, each ridge defining a raised portion and a recessed portion and a depth between said raised portion and recessed portion, the region having the plurality of ridges further having a width, said width and said depth being great enough such that the region having the plurality of ridges may be readily distinguished from the substantially smooth outer surface of the body when contacted by the hand.

14. In a beverage dispensing container of the type having a generally cylindrical body with a pair of opposing sides, said body defining a receptacle region for containing a liquid beverage and said top defining a pouring aperture from which a person may drink said beverage when said person grips said beverage dispensing container in a hand, said hand having a plurality of fingers and an opposable thumb, said pouring aperture being located generally adjacent to one of said sides of said cylindrical body, the improvement comprising:

a tactile stimulus producing member disposed on the body of the beverage dispensing container, said tactile stimulus producing member being positioned such that said tactile stimulus producing member is contacted one or more of the fingers of the person when the person grips the beverage dispensing container with the fingers of the hand contacting a first of the sides of the body and the thumb of the hand contacting a second of the sides of the body, said tactile stimulus producing member being predeterminately positioned and oriented in fixed relation to the second side of the body to which the pouring aperture is generally adjacent, whereby the person gripping the beverage dispensing container may selectively reorient the beverage dispensing container within the hand responsive to sensing the tactile stimulus producing member.

15. The beverage dispensing container of claim 14 wherein the pouring aperture is located generally adjacent to the second side of the body and the tactile stimulus producing member is positioned on the first side of the body generally diagonally opposing the second side of the body to which the pouring aperture is adjacent.

16. The beverage dispensing container of claim 15 wherein the body of the beverage dispensing container has a generally circular rim, there being a first point on said rim displaced the least distance from the pouring aperture and a second point on said rim generally diagonally opposing said first point, and further wherein the tactile stimulus producing member is positioned on the side of the body generally vertically beneath said second point on said rim.

17. The beverage dispensing container of claim 14 wherein the body has a substantially smooth surface, and wherein the tactile stimulus producing member comprises a recessed channel extending substantially vertically along the first side of the body.

18. The beverage dispensing container of claim 17 wherein the recessed channel has a depth measured radially inward from the surface of the body, said depth being great enough such that the recessed channel may be readily distinguished from the substantially smooth outer surface of the body when contacted by the hand.

19. The beverage dispensing container of claim 14 wherein the body has a substantially smooth surface and wherein the tactile stimulus producing member comprises a region having a plurality of parallel ridges extending substantially vertically along the body, each ridge defining a raised portion and a recessed portion and a depth between said raised portion and recessed portion, the region having the plurality of ridges further having a width, said width and said depth being great enough such that the region having the plurality of ridges may be readily distinguished from the substantially smooth outer surface of the body when contacted by the hand.

20. In a beverage dispensing container of the type having a generally cylindrical body with a pair of opposing sides and a generally smooth surface, said body defining a receptacle region for containing a liquid beverage and said top defining a pouring aperture from which a person may drink said beverage when said person grips said beverage dispensing container in a hand, said hand having a plurality of fingers and an opposable thumb, said pouring aperture being located generally adjacent to one of said sides of said cylindrical body, the improvement comprising:.

a tactile stimulus producing region, said tactile stimulus producing region including a line of one or more raised projections oriented vertically along the side of the body, said raised projections having a height, said height being great enough that the raised projections may be readily distinguished from the smooth surface of the body when contacted by the hand, said line of raised projections being positioned such that said line of raised projections is contacted by one or more of the fingers of the hand when the person grips the beverage dispensing container with the fingers of the hand contacting the body, said line of raised projections being predeterminately positioned and oriented in fixed relation to the side of the body to which the pouring aperture is generally adjacent, whereby the person gripping the beverage dispensing container may selectively reorient the beverage dispensing container within the hand responsive to sensing the tactile stimulus producing member.

21. The beverage dispensing container of claim 20 wherein the line of raised projections includes a plurality of raised dots, said dots being arranged to comprise letters and numerals of the braille alphabet.

22. The beverage dispensing container of claim 21 wherein the letters and numerals of the braille alphabet convey information regarding the beverage contained within the beverage dispensing can.

23. A method for orienting a pouring aperture having a position on a beverage dispensing container responsive to tactile sensing when a person grips a generally smooth surface of said beverage dispensing container with a thumb and one or more fingers of a hand, said pouring aperture on said beverage dispensing container being reoriented so as to permit said person to drink a beverage directly therefrom, said method comprising the steps of:

placing a tactile stimulus producing member on the body of the beverage dispensing container, said tactile stimulus producing member having a predetermined fixed position and orientation relative to the position of the pouring aperture on the beverage dispensing container, said tactile stimulus producing member being readily distinguishable from the generally smooth surface of the beverage dispensing container when contacted by the hand;

gripping the beverage dispensing container with the hand such that the thumb of the hand is positioned on and contacting a side of the beverage dispensing container and the one or more fingers of the hand are positioned on and contacting a side of the beverage dispensing container diagonally opposing the side of the beverage serving container contacting the thumb;

sensing the presence and position of said tactile stimulus producing member with the hand; and reorienting the pouring aperture of the beverage dispensing container responsive to said sensing by rotating the beverage dispensing container in the hand of the person so that the tactile stimulus producing member is positioned and oriented such that the person may drink the beverage directly from the pouring aperture.

* * * * *